United States Patent

Guarr et al.

[11] Patent Number: 6,137,620
[45] Date of Patent: Oct. 24, 2000

[54] ELECTROCHROMIC MEDIA WITH CONCENTRATION-ENHANCED STABILITY, PROCESS FOR THE PREPARATION THEREOF AND USE IN ELECTROCHROMIC DEVICES

[75] Inventors: Thomas F. Guarr, Holland; David A. Theiste, Byron Center; David J. Cammenga, Zeeland; John S. Anderson, Holland, all of Mich.

[73] Assignee: Gentex Corporation, Zeeland, Mich.

[21] Appl. No.: 09/302,886

[22] Filed: Apr. 30, 1999

[51] Int. Cl.$^7$ .............. G02F 1/153; G02F 1/00; G02B 5/23
[52] U.S. Cl. .......... 359/273; 359/267; 359/275; 252/583; 252/586
[58] Field of Search .............. 359/265, 267, 359/272, 273, 275; 252/583, 587, 586

[56] References Cited

U.S. PATENT DOCUMENTS

| | | | |
|---|---|---|---|
| 4,902,108 | 2/1990 | Byker | 350/357 |
| 5,128,787 | 7/1992 | Blonder | 350/338 |
| 5,204,778 | 4/1993 | Bechtel | 359/604 |
| 5,278,693 | 1/1994 | Theiste et al. | 359/272 |
| 5,280,380 | 1/1994 | Byker | 359/265 |
| 5,282,077 | 1/1994 | Byker | 359/272 |
| 5,294,376 | 3/1994 | Byker | 252/600 |
| 5,336,448 | 8/1994 | Byker | 252/583 |
| 5,434,407 | 7/1995 | Bauer et al. | 250/227.4 |
| 5,448,397 | 9/1995 | Tonar | 359/272 |
| 5,451,822 | 9/1995 | Bechtel et al. | 307/9.1 |
| 5,679,283 | 10/1997 | Tonar et al. | 252/583 |
| 5,770,114 | 6/1998 | Byker et al. | 252/583 |
| 5,881,431 | 3/1999 | Pieper, II et al. | 16/82 |
| 5,888,431 | 3/1999 | Tonar et al. | 252/583 |
| 5,998,617 | 12/1999 | Srinivasa et al. | 544/347 |
| 6,037,471 | 3/2000 | Srinivasa et al. | 546/257 |
| 6,057,956 | 5/2000 | Ash et al. | 359/267 |

FOREIGN PATENT DOCUMENTS

WO 98 42 796  10/1998  WIPO .............. C09K 9/02

OTHER PUBLICATIONS

Application Serial No. 08/616,967 and copy of Amendment dated Sep. 29, 1997.
Application Serial No. 08/832,596 and copy of Amendment dated Jun. 8, 1998.
Application for International No. PCT/WO97/EP498 titled Electrochromic System.
Application for International No. PCT/WO98/EP3862 titled Elektrochrome Polymersysteme.

Primary Examiner—Scott J. Sugarman
Assistant Examiner—David N. Spector
Attorney, Agent, or Firm—Brooks & Kushman; Brian J. Rees

[57] ABSTRACT

Increased stability of electrochromic devices containing an electrochromic medium having two or more electroactive compounds is accomplished by establishing current limiting concentrations of electroactive compounds with the larger redox potential difference. A process for production of electrochromic devices uses targeted concentrations of electroactive materials during preparation of the electrochromic medium which results in substantially no devices being produced wherein the current is limited by an electroactive compound having a low redox potential difference.

42 Claims, 2 Drawing Sheets

ELECTROCHROMIC MEDIA WITH CONCENTRATION-ENHANCED STABILITY, PROCESS FOR THE PREPARATION THEREOF AND USE IN ELECTROCHROMIC DEVICES

TECHNICAL FIELD

The present invention pertains to electrochromic devices and to electrochromic media useful in preparing such devices. More particularly, the present invention pertains to electrochromic media of enhanced stability, and to a process of manufacturing electrochromic devices wherein production of devices of lesser stability is avoided.

BACKGROUND ART

Electrochromic devices such as electrochromic mirrors and electrochromic windows are by now well known. Electrochromic devices generally contain at least two electroactive compounds, at least one of which exhibits absorbance in the visible spectrum in its oxidized or reduced state. By the term "electroactive" is meant a compound which is capable of being oxidized or reduced by application of an electric potential. By the term "electrochromic" is meant any electroactive compound which exhibits a change in color or absorbancy when oxidized or reduced.

Electrochromic devices, and electrochromic media suitable for use therein, are the subject of numerous U.S. patents, including U.S. Pat. No. 4,902,108, entitled "Single-Compartment, Self-Erasing, Solution-Phase Electrochromic Devices, Solutions for Use Therein, and Uses Thereof", issued Feb. 20, 1990 to H. J. Byker; Canadian Pat. No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device:, issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al., each of which patents is assigned to the assignee of the present invention and the disclosures of each of which are hereby incorporated herein by reference, are typical of modern day automatic rearview mirrors for motor vehicles. These patent references describe electrochromic devices, their manufacture, and electrochromic compounds useful therein, in great detail.

While numerous electrochromic devices are possible, the greatest interest and commercial importance are associated with electrochromic windows, light filters and mirrors. A brief discussion of these devices will help to facilitate an understanding of the present invention.

Electrochromic devices are, in general, prepared from two parallel substrates coated on their inner surfaces with conductive coatings, at least one of which is transparent such as tin oxide, or the like. Additional transparent conductive materials include fluorine doped tin oxide (FTO), tin doped indium oxide (ITO), ITO/metal/ITO (IMI) as disclosed in "Transparent Conductive Multilayer-Systems for FPD Applications", by J. Stollenwerk, B. Ocker, K. H. Kretschmer of LEYBOLD AG, Alzenau, Germany, and the materials described in above-referenced U.S. Pat. No. 5,202,787, such as TEC 20 or TEC 15, available from Libbey Owens-Ford Co. (LOF) of Toledo, OH. Co-filed U.S. Pat. Appln. entitled "AN IMPROVED ELECTRO-OPTIC DEVICE INCLUDING A LOW SHEET RESISTANCE, HIGH TRANSMISSION TRANSPARENT ELECTRODE" describes a low sheet resistance, high transmission, scratch resistant transparent electrode that forms strong bonds with adhesives, is not oxygen sensitive, and can be bent to form convex or aspheric electro-optic mirror elements or tempered in air without adverse side effects. The disclosure of this commonly assigned application is hereby incorporated herein by reference.

The two substrates of the device are separated by a gap or "cavity", into which is introduced the electrochromic medium. This medium contains at least one anodic or cathodic electrochromic compound which changes color upon electrochemical oxidation or reduction, and at least one additional electroactive species which may be reduced or oxidized to maintain charge neutrality. Upon application of a suitable voltage between the electrodes, the electroactive compounds are oxidized or reduced depending upon their redox type, changing the color of the electrochromic medium. In most applications, the electroactive compounds are electrochromic compounds which change from a colorless or near colorless state to a colored state. Upon removal of the potential difference between the electrodes, the electrochemically activated redox states of electroactive compounds react, becoming colorless again, and "clearing" the window.

Many improvements to electrochromic devices have been made. For example, use of a gel as a component of the electrochromic medium, as disclosed in U.S. Pat. Nos. 5,679,283 and 5,888,431, both entitled "Electrochromic Layer and Devices Comprising Same", and U.S. application Ser. No. 08/616,967, entitled "Improved Electrochromic Layer And Devices Comprising Same", have allowed the preparation of larger devices which are also less subject to hydrostatic pressure.

In electrochromic mirrors, devices are constructed with a reflecting surface located on the outer surface of the substrate which is most remote from the incident light (i.e. the back surface of the mirror), or on the inner surface of the substrate most remote from the incident light. Thus, light striking the mirror passes through the front substrate and its inner transparent conductive layer, through the electrochromic medium contained in the cavity defined by the two substrates, and is reflected back from a reflective surface as described previously. Application of voltage across the inner conductive coatings results in a change of the light reflectance of the mirror.

In electrochromic devices, the selection of the components of the electrochromic medium is critical. The medium must be capable of reversible color changes over a life cycle of many years, including cases where the device is subject to high temperatures as well as exposure to ultraviolet light. Thus, the industry constantly seeks new electrochromic media and new electroactive compounds which will resist aging, particularly in exterior locations. The effects of ultraviolet light, in particular, are felt more strongly when the electroactive compounds contained in electrochromic media are energized to their respective oxidized and reduced states.

In many applications, for example electrochromic mirrors, it is desirable that the mirror, both in its inactive as well as its active state, be a relatively neutral color, for example gray. In addition, it is desirable that the color can be maintained over a range of voltage, for example, that the absorbance of the electrochromic medium may be changed without undesirably changing the hue, in particular between "full dark" and "clear" conditions.

Prior art electrochromic media generally employed two electrochromic compounds, one anodic and one cathodic, and were unable to acceptably produce gray shades, and numerous other shades of color as well. In U.S. application Ser. No. 08/837,596 filed Apr. 2, 1997, herein incorporated by reference, non-staging devices capable of achieving a preselected color are disclosed. These devices contain at least three active materials, at least two of which are electrochromic compounds, and exhibit little or no staging while being available in neutral colors such as gray, or in other preselected colors not normally available.

To maintain electrical neutrality in electrochromic devices, for each oxidation involving a single electron at the anode, a corresponding reduction must occur at the cathode. Moreover, as the number of electrons transferred at each of the two electrodes must be the same, a two electron event occurring at one electrode must be balanced by either two single electron events or a single two electron event at the opposing electrode.

While in principle it is possible for an electrochromic device to contain only one electrochromic compound together with an electroactive compound which is colorless in both the unactivated and activated states, in the majority of devices, both the anodic electroactive compound and the cathodic electroactive compound are electrochromic compounds. In this way, colored species are generated at each electrode. Thus, the coloration is intensified, at the same current level, by employing two electrochromic compounds as opposed to one electrochromic compound and one colorless electroactive compound.

A significant improvement in the stability of electrochromic devices is disclosed in U.S. Pat. No. 4,902,108 which employs electrochromic compounds displaying two chemically reversible waves in a cyclic voltammogram. Such compounds have minimally two electrochemically activated states. The observation of a second chemically reversible wave is an indication that the second electrochemically activated state is reasonably stable.

When employing electrochromic compounds which display two chemically reversible waves in their cyclic votammograms, the device potential is generally set to generate species of the first electrochemically activated state only. However, in these devices, higher redox state species are created by disproportionation of two species in the first electrochemically activated state, for example, $2A^+ \rightleftharpoons A^0 + A^{2+}$. Because of the higher potential of the 2+ species, the equilibrium lies to the left. However, because the 2+ species is more reactive, and more subject to irreversible chemical change, the continual removal of this species, even though ordinarily present in extremely small quantities, can result in the long term degradation of device performance. Thus, it is still desirable to improve the stability of electrochromic devices, both those containing electrochromic compounds having but a single electrochemically activated state as well as those displaying a two or more sets of waves in a cyclic voltammogram, whether chemically reversible or irreversible.

It has been desirable to limit the amounts of the electrochemically activated states of the electroactive compounds to sufficient amounts such that the degree of absorbance required for the device was obtained. As discussed previously, for every electron transferred at the cathode in the reduction of the cathodic material will be matched at the anode by the transfer of an electron involved in the oxidation of the anodic material. In other words, the number of moles of electrons transferred at the cathode will equal the number of moles of electrons transferred at the anode. This condition applies to the rates of electron transfer (the current passed) as well as the total number of electrons transferred. The current of an electrochemical reaction is related to the diffusion of the material being oxidized or reduced as well as its concentration or abundance. For example, in "A CALCULATION OF STEADY STATE ELECTROCOLORATION PARAMETERS ON ELECTROCHROMIC SYSTEMS" an equation relating current density to the diffusion coefficients and concentrations is given. In electrochromic devices the diffusion rates for the various redox forms of the materials are, generally different. Therefore the actual amounts of anodic and cathodic materials required to achieve this balanced current condition where no excess anodic materials are present at the anode nor excess cathodic materials present at the cathode will differ from a 1:1 ratio. In general a mole ratio of less mobile electroactive material to the more mobile material will be greater than 1:1 to achieve current balance. The concentrations of electroactive materials required to achieve this current balance may be termed the "balanced concentrations".

DISCLOSURE OF THE INVENTION

It has now been unexpectedly discovered that significant improvements in the stability of electrochromic devices can be achieved by controlling the relative abundances of the electroactive materials in the electrochromic medium. This enhanced stability can be achieved by ensuring that the electrochromic medium contains the electroactive material having a smaller redox potential difference in excess over the amount required for current balance, in other words, a concentration larger than the balanced concentration. For electrochromic media containing at least one electroactive material having only a single electrochemically activated state, device performance can be improved by ensuring that the electroactive material having at least two electrochemically activated states is present in a concentration larger than that required for a balanced concentration. For electrochromic media containing at least one electroactive material having a reactive electrochemically activated state, device performance can be improved by ensuring that this latter material is present in concentrations larger than that required for a balanced concentration.

BEST MODE FOR CARRYING OUT THE INVENTION

Figure 1:
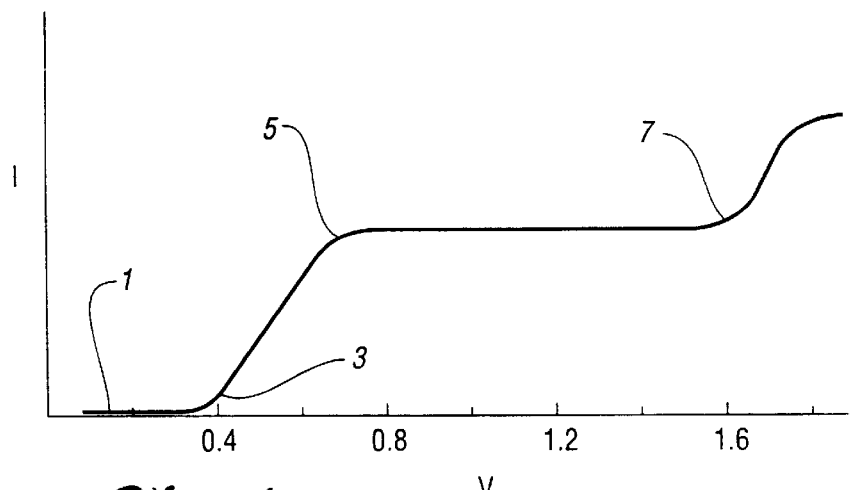
FIG. 1 illustrates the current versus voltage behavior of an electrochromic device with an electrochromic medium containing a cathodic electrochromic compound and an anodic electrochromic compound in balanced concentrations.

The electrochromic medium includes anodic and cathodic materials that may be contained in solution in the ionically conducting electrolyte, which remain in solution in the electrolyte when electrochemically oxidized or reduced. Solution phase electroactive materials may be contained in the continuous solution phase of a cross-linked polymer matrix in accordance with the teachings of U.S. patent application Ser. No. 08/616,967, entitled "IMPROVED ELECTROCHROMIC LAYER AND DEVICES COMPRISING SAME" and International Patent Application Serial No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES".

More than one anodic or cathodic material can be combined to give a pre-selected color as described in U.S. application Ser. No. 08/832,596 entitled "ELECTROCHROMIC MEDIUM CAPABLE FOR PRODUCING A PRESELECTED COLOR".

The anodic and cathodic materials can be combined or linked by a bridging unit as described in International Patent Application Serial No. PCT/WO97/EP498 entitled "ELECTROCHROMIC SYSTEM". It is also possible to link anodic or cathodic materials by similar methods.

Additionally the anodic and cathodic materials can be incorporated into the polymer matrix as described in International Patent Application Serial No. PCT/WO98/EP3862 entitled "ELECTROCHROMIC POLYMER SYSTEM" and International Patent Application Serial No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES".

In addition the electrochromic medium may also contain other materials such as light absorbers, light stabilizers, thermal stabilizers, antioxidants, thickeners or viscosity modifiers as well as supporting electrolytes or other materials commonly known.

Anodic and cathodic electrochromic compounds are by now well known. The electrochromic compounds may have only a single electrochemically activated state, but preferably have at least two electrochemically activated states. Electrochromic compounds with more than two electrochemically activated states are also useful. Preferably, electrochromic media comprising compounds each displaying at least two chemically reversible waves in a cyclic voltammogram are employed.

Alternatively, electrochromic compounds exhibiting but a single electrochemically activated state are useful, for example metallocene electrochromic compounds such as ferrocene and substituted ferrocenes, as are commonly known.

Preferred electrochromic compounds are those exhibiting two or more sets of waves in a cyclic voltammogram, whether chemically reversible or irreversible. More preferably, the electrochromic compounds exhibit two or more chemically reversible waves in a cyclic voltammogram. Examples of preferred anodic compounds are the various 5,10-dihydrophenazines, particularly ring substituted and ring unsubstituted 5,10-dialkyl-5,10-dihydrophenazines, most particularly those which are 5,10-dimethyl-5,10-dihydrophenazines. Examples of dihydrophenazines which are suitable may be found in U.S. Pat. No. 4,902,108, and U.S. application Ser. No. 08/837,597, which are incorporated herein by reference.

Suitable cathodic compounds are also known, and are identified in the foregoing U.S. patents. Preferred electrochromic materials are the various substituted and unsubstituted bipyridinium salts, such as 1,1'-dialkyl-4,4'-bipyridinium salts. Such compounds are frequently termed "viologens". Substituted bipyridinium salts such as those disclosed in U.S. patent application Ser. No. 08/831,809 are also useful.

In place of an electrochromic compound, an electroactive compound which is not electrochromic may be used. Electroactive compounds which are not electrochromic are compounds which are reversibly oxidizable or reducible, but which have substantially the same color in their unactivated and electrochemically activated states. Such electroactive compounds may be anodic or cathodic. Use of a "colorless" electroactive compound with a single electrochromic compound in an electrochromic medium limits the perceived color of an electrochromic device containing such a medium to the color of the single electrochromic compound. However, such electroactive compounds may be used with two or more electrochromic compounds, thus providing devices capable of producing a preselected color.

In the present invention, an excess of the electroactive compound with the smaller redox potential difference, this excess based on the balanced concentration as previously defined, is required to be present. Moreover, the present invention pertains to the production of electrochromic devices, such that an amount of the foregoing electroactive compound in excess will be targeted. In this manner, no or very few devices will be produced with electrochromic media containing an excess of the electroactive compound with larger redox potential difference in spite of manufacturing variability. In other words, the "target composition" of the electrochromic medium in the subject process will be such that the average device produced will contain an excess of the electroactive compound with the smaller redox potential difference.

FIG. 1 represents an example of the concepts described herein, a cathodic material C and an anodic material A are contained in a medium in a device. These materials undergo the following electrochemical reactions, generating the electrochemically activated states $C^{i-}$, $C^{j-}$, $A^{m+}$, and $A^{n+}$, where j>i and n>m.

$$C + ie^- \rightarrow C^{i-}$$

$$C + je^- \rightarrow C^{j-}$$

$$A - me^- \rightarrow A^{m+}$$

$$A - ne^- \rightarrow A^{n+}$$

In FIG. 1, 1 represents the region where there is insufficient potential applied to the device to cause the electrochemical oxidation and reduction of the materials A and C in the electrochemic medium. At the point 3 of the potential becomes large enough to cause the electrochemical reactions.

$$C + ie^- \rightarrow C^{i-}$$

and $$A - me^- \rightarrow A^{m+}$$

to occur. The current rises with the increasing potential until 5 is reached, after this point there is seen a plateau. The device of FIG. 1 has amounts (i.e. concentrations) of A and C in the electrochromic medium that are said to be balanced, that is for the region of potentials between point 5 and 7 the anodic material is completely, or nearly completely converted into its electrochemically activated form. At the cathode in much the same way the cathodic material C is completely converted to its electrochemically activated form. Thus, balanced concentration does not in general refer to equal molar concentrations, but concentrations of anodic and cathodic materials such that when all, or nearly all of one electroactive material is converted to its electrochemically activated state at one electrode, the complementary electroactive material is also completely or nearly completely converted at the other electrode. Since in this region the medium has no further capacity to generate the activated form of A or C at a faster rate, no significant increase is seen in the current for this potential range. After point 7 a sufficient potential is applied for the reactions $$C + je^- \rightarrow C^{j-}$$

and $$A - n_A e^- \rightarrow A^{n+}$$

to occur directly, and in this region the current is seen to rise again with increasing potential. This region of potentials which cause currents associated with the formation of the more highly oxidized or reduced forms of the electroactive materials in the medium is referred to the "overvoltage region" and the potential range from zero to the potential associated with the end of the first current plateau (point 7 in FIG. 1) is referred to as the "normal potential range" of the device. This analysis will apply to an electrochromic device and a medium with three or more electroactive materials, with the total anodic mixture $A_1$ through $A_n$ replacing A and $C_1$ through $C_n$ replacing C. However, the use of more than one material of the same redox type with different potentials may introduce a shoulder in these graphs referred to as an i-E curve.

Figure 2:
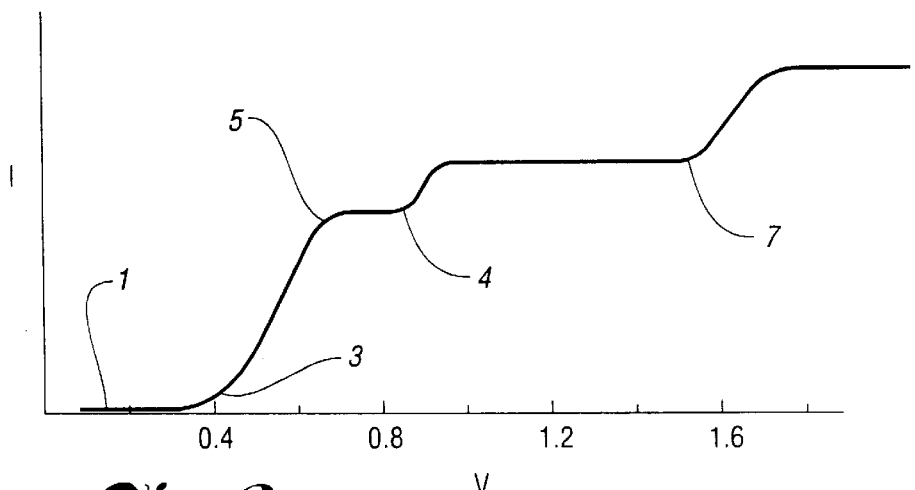
FIG. 2 illustrates a current versus voltage curve for an electrochromic device with an electrochromic medium containing an anodic electrochromic compound and a cathodic electrochromic compound wherein the anodic electrochromic compound has a larger redox potential difference, and is in excess over the balanced concentration. The cathodic material is current limiting.
Figure 3:
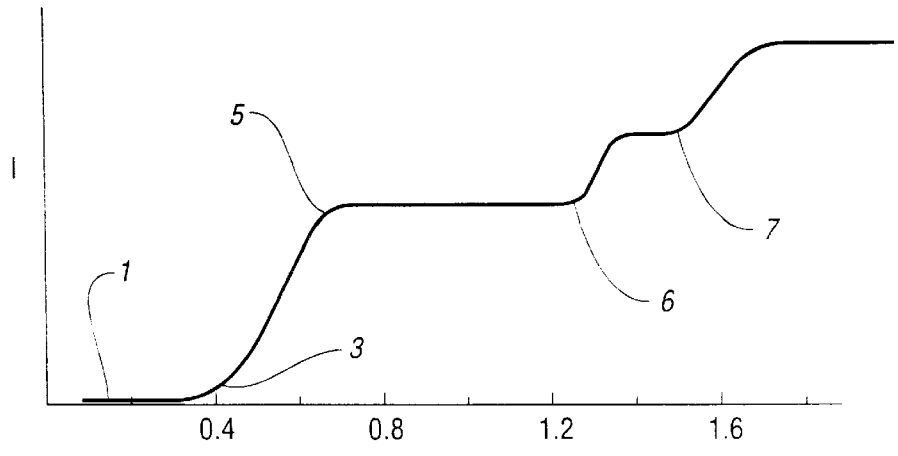
FIG. 3 illustrates a current versus voltage curve for an electrochromic device with an electrochromic medium containing an anodic electrochromic compound and a cathodic electrochromic compound wherein the cathodic electrochromic compound has a smaller redox potential difference, and is in excess over the balanced concentration. The anodic material is current limiting.

If a production process is designed for manufacturing devices with a medium containing a balanced amount of the anodic and cathodic materials, manufacturing variations will lead to production of a devices with i-E plots similar to those of FIGS. 2 and 3. In FIG. 2, region 1 and points 3 and 5 appear the same as in FIG. 1, however at point 4 the current begins to increase to a second plateau. In this case, at point 5, all or nearly all of species C is converted to its electrochemically activated state at the cathode, but at the anode there is an excess of anodic material A that is not converted. When point 4 is reached the A can be converted to $A^{m+}$ since there is now a high enough potential for the reaction.

$$C + je^- \rightarrow C^{j-}$$

occur directly at the cathode. Thus this device would be outside its normal potential range at a potential where the ideally produced device would still be within its normal voltage range. This i-E curve is characteristic of a device referred to as being current limited by the cathodic material.

Similarly FIG. 3 depicts the i-E curve for a device that is current limited by the anodic material, A. In FIG. 3 the point 6 indicates the potential where the excess C can be converted now that the anodic reaction $$A - ne^- \rightarrow A^{n+}$$

can occur directly at the anode, since a sufficient potential has been applied. In this case the normal potential range extends to 6.

Thus, FIGS. 1 through 3 demonstrate the ability to change the normal operating voltage range of a device simply through variation of relative amounts of the anodic and cathodic materials in the electrochromic medium.

In accordance with the present invention, it has been discovered that production of devices so that the case in FIG. 3, rather than that of FIG. 1, is targeted leads to improved device stability and eliminates undesirable effects due to manufacturing variability. A preferred concentration excess over the balanced concentration is about 3% or more (based on electrochemical equivalents), preferably about 5% or more.

Without wishing to be bound to any particular theory, we will now embark on a discussion of equilibrium chemistry to explain this discovery and to show that this discovery has far reaching implications beyond electrochromic devices with materials that have two reversible oxidation and reduction waves.

For materials such as A the following reaction can occur $$nA^{m+} \rightarrow (n-m)A + mA^{n+}$$

Furthermore, an equilibrium constant for this disproportionation reaction can be related to the potential difference between the two oxidation waves, $$K_{disp} = [A]^{n-m}[A^{n+}]^m / [A^{m+}]^n.$$

An analogous reaction and constant exists for the cathodic material C.

In general, for compounds possessing two electrochemically activated states, the tendency of the first electrochemically activated state to undergo disproportionation (as described by the equilibrium constant $K_{disp}$) is related to the redox potential difference $$\ln(K_{disp}) = -nF|\Delta E|/RT$$

where n=number of electrons transferred,
F=Faraday's constant,
R=the universal gas constant,
T=the temperature (in degrees Kelvin), and
the quantity $|\Delta E|$ represents the absolute value of the difference between the redox potentials of the first and second electrochemical processes (in Volts). In the case where the electroactive material has only a single electrochemically activated state, the quantity $|\Delta E|$ represents the absolute value of the difference between the redox potential of the material and the nearer of the anodic and cathodic potential limits of the electrochromic medium. In the case where the electroactive material has more than two electrochemically activated states, the quantity $\Delta E$ refers to the largest potential difference for adjacent electrochemical activation processes.

For a single electron process at 25° C.:

$$\log(K_{disp}) = \Delta E / 0.059$$

or, $$K_{disp} = 10^{-\Delta E/0.059}$$

When the cathodic material is current limiting and the initial concentration, in a balanced sense, is 0.02M, that is the ability to generate the electrochemically activated form of the cathodic material. If A exists in a 5% excess then at the anode 0.001M A will be unconverted. Further let us assign $10^{-7}$ for $K_{disp}$ for C (corresponding to a $\Delta E$ of about 350 mV) and $10^{-10}$ for $K_{disp}$ for A (corresponding to $\Delta E$ of 590 mV). The equilibrium equations for n=2, m=1, i=1, and j=2 give:

$$10^{-10} = [A][A^{2+}]/[A^+]^2 = 0.001[A^{2+}]/0.02[A^{2+}] = 4.0 \times 10^{-11} M.$$

If we assume that $[C] = [C^{2-}]$ $$10^{-7} = [C][C^{2-}]/[C^-]^2 = [C][C^{2-}]/0.02[C^{2-}] = 6.3 \times 10^{-6} M.$$

The total amount of doubly oxidized and reduced material in the medium is about $6.3 \times 10^{-6} M$.

When A is current limiting and C is in 5% excess, with the assumptions and limitations above $$10^{-10} = [A][A^{2+}]/[A^+]^2 = [A][A^{2+}]/0.02[A^{2+}] = 2.0 \times 10^{-7} M.$$

$$10^{-7} = [C][C^{2-}]/[C^-]^2 = 0.001[C^{2-}]/0.02[C^{2-}] = 4.0 \times 10^{-8} M.$$

The total amount of doubly oxidized and reduced material in the medium is about $2.4 \times 10^{-7} M$.

More than an order of magnitude reduction in the total amount of doubly oxidized and doubly reduced material in the medium is realized when the material with the larger disproportionation constant is included in excess. Thus, by employing an electrochromic medium containing the electroactive compound with the smaller redox potential difference in an amount larger than that required for current balance, the concentration of the second (or higher) electrochemically activated states can be minimized.

Figure 4:
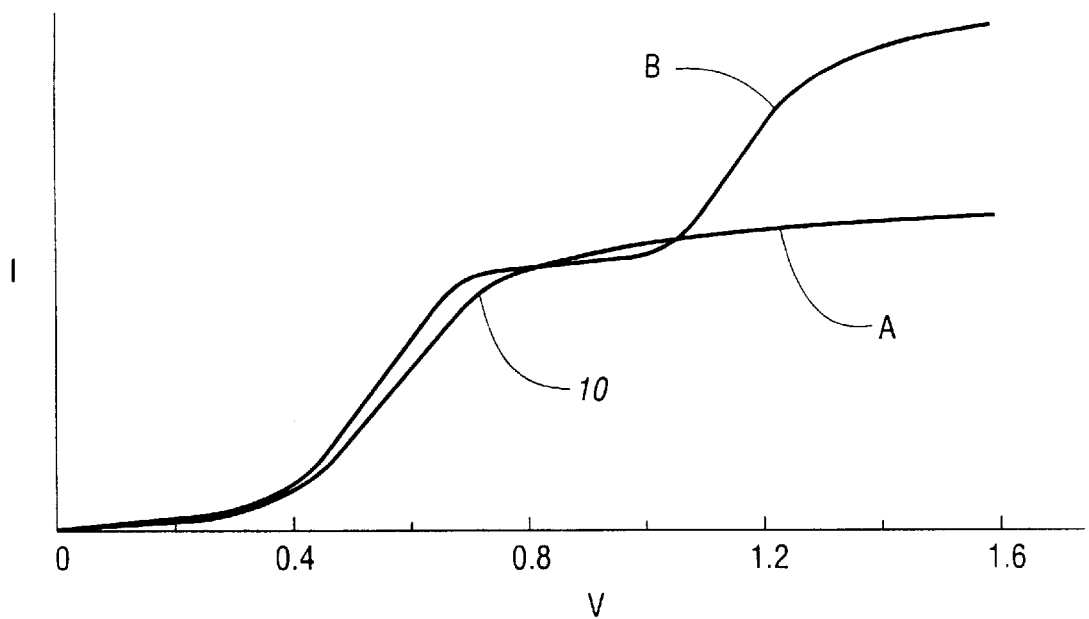
FIG. 4 illustrates current versus voltage curves for electrochromic devices with electrochromic media containing an electrochromic compound having but a single redox state and an electrochromic compound having two redox states, wherein (A) the current is limited by the amount of the electrochromic compound with but a single electrochemically activated state, and (B) the current is limited by the electrochromic compound having two electrochemically activated states.

Materials that have only one oxidation or reduction wave can also be described within the teachings of this disclosure. As is seen in FIG. 4, the i-E plot for a device with a medium having only one oxidation for the anodic material, curve A shows a plot for the case where the cathodic material is in excess and curve B shows the case where the anodic material is in excess. Curve A shows a rise to a long plateau from point 10, indicating that not enough uncoverted A exists at the anode to allow for direct conversion of the cathodic material to its more highly reduced form at the cathode, and no oxidation processes associated with the conversion of the anodic material to a more highly oxidized form in association with the direct reduction of the cathodic material to its more highly reduced form at the cathode and the current is seen to rise as the potential is increased.

The teachings of this invention can also be used to minimize the production of the more reactive second (or higher) electrochemically activated state. For example, if the electrochromic medium contains an electroactive compound which is known to have a particularly reactive second electrochemically activated state, adjusting the concentrations of the anodic and cathodic materials so that this compound is present in an amount larger than that required for current balance would result in minimal formation of the reactive state. One obvious indication of a reactive electrochemically activated state is the observation of a chemically irreversible wave in its cyclic voltammogram. Prior to this invention, and in the absence of such indication, determination of the relative reactivity of higher electrochemically activated states was a difficult, time consuming and tedious process, typically involving bulk electrolysis, coulometery, and various means of chemical analysis. Often, it was not possible to perform such studies under conditions that were relevant to the normal operation of a electrochromic device.

Determination of the relative reactivity of higher electrochemically activated states can be done in a simple and straightforward manner in light of this invention. First, two test devices are constructed, one containing the cathodic compound(s) in an amount larger than that required for current balance, and a second one containing the anodic compound(s) in an amount larger than that required for current balance. Next, the current-voltage curves for each device are measured. A constant voltage sufficient to cause the direct generation of the second electrochemically activated state of the current limiting component is then applied to each device. Periodically, the application of this voltage is interrupted and the optical spectrum is measured at open circuit. The device containing the electroactive component having the more reactive second (or higher) electrochemically activated state in excess will generally exhibit a smaller amount of impurities, such as residual electrochemically activated materials than the device containing the electroactive component having the less reactive second (or higher) electrochemically activated state in excess. Typically, observation of the spectral changes required to determine the relative reactivity of higher electrochemically activated states in this manner requires application of the voltage as described above for less than 48 hours.

Having generally described this invention, a further understanding can be obtained by reference to certain specific examples which are provided herein for purposes of illustration only and are not intended to be limiting unless otherwise specified.

EXAMPLE 1

An electrochromic medium was prepared as follows: two solutions were prepared; solution A containing 5,10-dimethyl-5,10-dihydrophenazine in propylene carbonate with 0.03M Tinuvin P as a UV absorber and 3 weight percent polymethylmethacrylate as a thickening agent; solution B containing 1,1'-bis(3-phenyl(n-propyl))-4,4'-bipyridinium bis(tetrafluoroborate) in propylene carbonate with 0.03M Tinuvin P as a UV absorber and 3 weight percent polymethylmethacrylate as a thickening agent. The two solutions were mixed to produce a solution containing balanced concentrations (about 0.0348M 1,1'-bis(3-phenyl(n- propyl))-4,4'-bipyridinium bis(tetrafluoroborate) and 0.0273M 5,10-dimethyl, 5,10-dihydrophenazine). The resulting mixture was dispensed into the chamber of an electrochromic mirror of commercial shape approximately 5 cm by 25 cm using two pieces of TEC (LOF) glass with a sheet resistance of about 10 ohms/square.

The i-E characteristics of this device were studied by stepping the applied potential in 10 mV increments and measuring the steady state current after each step. The resultant i-E plot is shown in FIG. 1.

EXAMPLE 2

An electrochromic medium was prepared as follows: two solutions were prepared as in Example 1. The two solutions were mixed in a ratio of slightly less solution B to solution A than in Example 1, and introduced into the chamber of an electrochromic mirror as in Example 1.

The i-E characteristics of this device were studied by stepping the applied potential in 10 mV increments and measuring the steady state current after each step. The resultant i-E plot is shown in FIG. 2.

EXAMPLE 3

An electrochromic medium was prepared as follows: two solutions were prepared as in Example 1. The two solutions were mixed in a ratio of slightly more solution B to solution A than in Example 1, and introduced into the chamber of an electrochromic mirror as in Example 1.

The i-E characteristics of this device were studied by stepping the applied potential in 10 mV increments and measuring the steady state current after each step. The resultant i-E plot is shown in FIG. 3.

EXAMPLE 4

An electrochromic medium was prepared as follows: 28 mg of di-t-butyldiethylferrocene and 38 mg of 1,1'-dimethyl-4,4'-bipyridinium tetrafluoroborate were added to 5 ml of a solution of propylene carbonate containing 30 mM Tinuvin P as a UV absorber and 3% (w/w) polymethylmethacrylate as a thickening agent. This solution was used to fill a small electrochromic device (approximately 1 in.×3 in.). The device consisted of two plates of glass, each coated on its inner surface with a layer of fluorine-doped tin oxide having a sheet resistance of about 15 ohms per square. The plates were held in a substantially parallel, spaced apart relationship by a perimeter seal roughly 0.0135 cm in thickness. Two small holes had been drilled through one of the plates, and these were used to fill the device by introducing the solution into one of the holes under pressure, with the second hole providing pressure relief. After the device was filled, both holes were plugged using a hot glue gun and metal clips were attached to one edge of each plate to provide for electrical contact.

The i-E characteristics of this device were studied by stepping the applied potential in 10 mV increments and measuring the steady state current after each step. The resultant i-E plot is shown in FIG. 4A.

EXAMPLE 5

An electrochromic medium was prepared as follows: 44 mg of 1,1'-di-t-butyldiethylferrocene and 29 mg of 1,1'-dimethyl-4,4'-bipyridinium tetrafluoroborate were added to 5 ml of a solution of propylene carbonate containing 30 mM Tinuvin P as a UV absorber and 3% (w/w) polymethylmethacrylate as a thickening agent. This solution was used to fill a small electrochromic device (approximately 1 in.×3 in.) as detailed in Example 4.

The i-E characteristics of this device were studied by stepping the applied potential in 10 mV increments and measuring the steady state current after each step. The resultant i-E plot is shown in FIG. 4B.

EXAMPLE 6

Two small electrochromic devices (approximately 1 in.×3 in.) were prepared as detailed in Example 4 and filled as follows: the device of Example 6A was filled with a solution of 21 mg of 5,10-dimethyl-5,10-dihydrophenazine and 102 mg of 1,1'-dibenzyl-4,4'-bipyridinium tetrafluoroborate in 5 ml of propylene carbonate; the device of Example 6B was filled with a solution of 42 mg of 5,10-dimethyl-5,10-dihydrophenazine and 51 mg of 1,1'-dibenzyl-4,4'-bipyridinium tetrafluoroborate in 5 ml of propylene carbonate.

Figure 5:
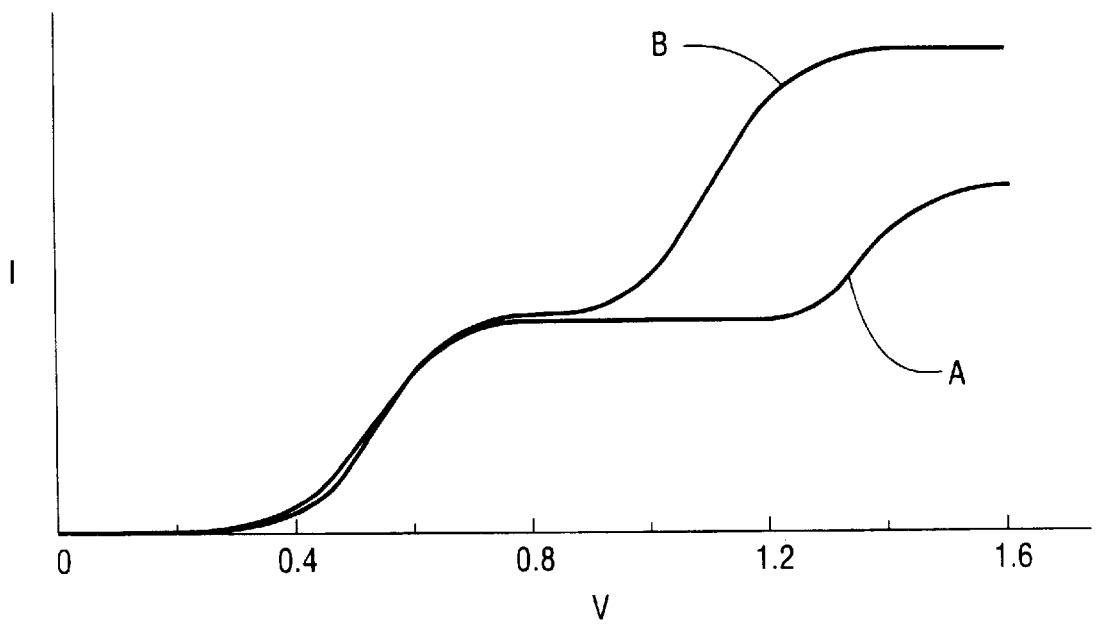
FIG. 5 illustrates current versus voltage curves for electrochromic devices with electrochromic media containing an anodic electrochromic compound and a cathodic electrochromic compound wherein (A) the current is limited by the anodic compound, and (B) the current is limited by the cathodic compound. The second electrochemically activated state of the anodic compound is more stable than the second electrochemically activated state of the cathodic compound.

The i-E characteristics of these devices were studied by stepping the applied potential in 10 mV increments from 0 to 2.1 V and measuring the steady state current after each step. The resultant i-E plots are shown in FIG. 5. A constant potential of 1.6 V was then applied to both devices. After 30 minutes, the applied voltage was set to 0 V and the devices were allowed to remain in their unpowered states for several minutes. At this point device 6A appeared very slightly blue, while device 6B was moderately yellow-green. The applied voltage was again set to 1.6 V and held at this level for 2 hours. Examination of the residual colors again revealed that device 6A was very slightly blue, while the yellow-green coloration of device 6B was more pronounced. These results indicate that the second electrochemically activated state of the bipyridinium species is less stable than the second electrochemically activated species of 5,10-dimethyl-5,10-dihydrophenazine.

By the term "a" and "an" as used in the claims is meant "one or more" unless the context clearly indicates otherwise. The term "current limiting" refers to the compound which limits device current, in other words, the electroactive material that is completely or nearly completely converted to an electrochemically activated state as it reaches the proper electrode, where some of the complementary electroactive material is not converted to an electrochemically activated state at the complementary electrode.

What is claimed is:

1. An electrochromic medium, comprising:
   a) a solvent
   b) an anodic electroactive material which exhibits at least two chemically reversible waves in a cyclic voltammogram in said solvent at room temperature,
   c) a cathodic electroactive material which exhibits at least two chemically reversible waves in a cyclic voltammogram in said solvent at room temperature;
   wherein at least one of said electroactive materials is electrochromic, and wherein the electroactive material having the smaller potential difference between the chemically reversible waves has a concentration in the electrochromic medium greater than that required to achieve a balanced concentration.

2. The electrochromic medium of claim 1, comprising two electroactive materials, both of which are electrochromic.

3. The electrochromic medium of claim 1, comprising at least three electroactive materials, at least two of which are electrochromic.

4. The electrochromic medium of claim 3, wherein at least three electrochromic materials are present.

5. The electrochromic medium of claim 1, wherein said solvent is contained in a gel or a swellable polymer.

6. The electrochromic medium of claim 1, wherein said anodic electroactive materials are 5,10-dihydrophenazines.

7. The electrochromic medium of claim 1, wherein said cathodic electroactive materials are bipyridinium salts.

8. The electrochromic medium of claim 1, wherein said electroactive material having the smaller potential difference between the chemically reversible waves has a concentration in the electrochromic medium which is greater by 3 equivalent percent or more over the balanced concentration.

9. The electrochromic medium of claim 1, wherein said electroactive material having the smaller potential difference between the chemically reversible waves has a concentration in the electrochromic medium which is greater by 5 equivalent percent or more over the balanced concentration.

10. An electrochromic medium comprising
   a) an anodic electroactive material,
   b) a cathodic electroactive material,
   wherein at least one of said electroactive materials is electrochromic,
   wherein one of said electroactive materials has only one electrochemically activated state, and wherein a second electroactive material has at least two chemically electrochemically activated states, and wherein the electroactive material with at least two electrochemically activated states has a concentration in the electrochromic medium greater than that required to achieve a balanced concentration.

11. The electrochromic medium of claim 10, wherein said electrochemical medium comprises at least one electroactive material having at least two chemically reversible waves in a cyclic voltammogram.

12. The electrochromic medium of claim 10, wherein said electroactive material with at least two activated states is present in said electrochromic medium in a concentration which is greater by 3 equivalent percent or more over the balanced concentration.

13. The electrochromic medium of claim 10, wherein said electroactive material with at least two activated states is present in said electrochromic medium in a concentration which is greater by 5 equivalent percent or more over the balanced concentration.

14. An electrochromic medium, comprising:
   a) an anodic electroactive material,
   b) a cathodic electroactive material,
   wherein one of said anodic electroactive material(s) and said cathodic electroactive material(s) has an electrochemically activated state which exhibits greater reactivity than the electrochemically activated state of other of said electroactive materials, wherein the electroactive material exhibiting said greater reactivity is present in concentration greater than that required to achieve a balanced concentration.

15. The electrochromic medium of claim 14, wherein said anodic electroactive material has an electrochemically activated state which exhibits the greater reactivity, and said anodic electroactive material is present in a concentration greater than that required to achieve a balanced concentration.

16. The electrochromic medium of claim 14, wherein said cathodic electroactive material has an electrochemically activated state which exhibits the greater reactivity, and said cathodic electroactive material is present in a concentration greater than that required to achieve a balanced concentration.

17. The electrochromic medium of claim 14, wherein said electroactive material which exhibits greater reactivity is present in a concentration of 3 equivalent percent or more greater than the balanced concentration.

18. The electrochromic medium of claim 14, wherein said electroactive material which exhibits greater reactivity is present in a concentration of 5 equivalent percent or more greater than the balanced concentration.

19. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 1.

20. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 2.

21. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 3.

22. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 4.

23. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 10.

24. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 11.

25. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 14.

26. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 15.

27. An electrochromic device comprising front and rear spaced elements each having front and rear surfaces, said rear surface of said front element having a transparent conductive material disposed thereon, said front surface of said rear element having a conductive material disposed thereon or said rear element itself being conductive, wherein said front and rear elements are sealably bonded together in a spaced apart relationship to define a cavity, where said cavity contains the electrochromic medium of claim 16.

28. The electrochromic device of claim 19, wherein said device is an electrochromic mirror.

29. The electrochromic device of claim 20, wherein said device is an electrochromic mirror.

30. The electrochromic device of claim 21, wherein said device is an electrochromic mirror.

31. The electrochromic device of claim 22, wherein said device is an electrochromic mirror.

32. The electrochromic device of claim 23, wherein said device is an electrochromic mirror.

33. The electrochromic device of claim 24, wherein said device is an electrochromic mirror.

34. The electrochromic device of claim 25, wherein said device is an electrochromic mirror.

35. The electrochromic device of claim 26, wherein said device is an electrochromic mirror.

36. The electrochromic device of claim 27, wherein said device is an electrochromic mirror.

37. A process for the preparation of an electrochromic device wherein an electrochromic medium is introduced into a cavity in said device, said electrochromic medium containing at least one anodic electroactive compound and at least one cathodic electroactive compound, at least one of said electroactive compounds being an electrochromic compound, the improvement comprising:

adjusting the concentrations of said electroactive compounds to establish an increased relative concentration of the electroactive material having the smaller redox potential difference such that said increased concentration is greater than that required to achieve a balanced concentration.

38. The process of claim 37, wherein said increased concentration is sufficient to substantially eliminate production of devices having the electroactive material having the smaller redox potential difference as the current limiting species or less than that required to achieve a balanced concentration due to variations in measuring the relative amounts of electroactive compounds when preparing said electrochromic medium.

39. The process of claim 37, wherein at least one anodic electroactive compound ($A_1$) which exhibits two chemically reversible waves in a cyclic voltammogram is present and at least one cathodic electroactive compound ($C_1$) which exhibits two chemically reversible waves is present, the electroactive compound ($A_1$) or ($C_1$) having the largest redox potential difference being present in a concentration less than that required to achieve a balanced concentration.

40. The process of claim 37, wherein at least one anodic electroactive compound ($A_1$) which exhibits two chemically reversible waves in a cyclic voltammogram is present and at least one cathodic electroactive compound ($C_1$) which exhibits two chemically reversible waves is present, the electroactive compound ($A_1$) or ($C_1$) having the smallest redox potential difference being present in a concentration greater than that required to achieve a balanced concentration.

41. The process of claim 37, wherein one of said electroactive materials is an anodic electroactive compound ($A_1$) or a cathodic electroactive compound ($C_1$) which exhibits two chemically reversible waves in a cyclic voltammogram, and one of said electroactive materials is an electroactive compound ($A_2$) which exhibits only one electrochemically activated state, or a cathodic electroactive compound ($C_2$) which exhibits only one electrochemically activated state, wherein said electroactive compound ($A_2$) or ($C_2$) is present in a concentration less than that required to achieve a balanced concentration.

42. The process of claim 37, wherein at least one of said electroactive materials exhibits an electrochemically activated state which is less chemically stable than the electrochemically activated states of other electroactive materials in said electrochromic medium, said electroactive material which exhibits said less chemically stable electrochemically activated state being present in a concentration greater than that required to achieve a balanced concentration.

* * * * *